United States Patent [19]

Precourt

[11] Patent Number: 4,541,019

[45] Date of Patent: Sep. 10, 1985

[54] RECORDING SYSTEM FOR RECORDING DATA ON TAPE IN A DISK-RECORDING FORMAT

[75] Inventor: Normand E. Precourt, San Diego, Calif.

[73] Assignee: Cipher Data Products, Inc., San Diego, Calif.

[21] Appl. No.: 444,712

[22] Filed: Nov. 26, 1982

[51] Int. Cl.³ .............................................. G11B 5/86
[52] U.S. Cl. ..................................... 360/15; 360/48; 364/200
[58] Field of Search ................... 360/15, 48, 50, 72.1, 360/72.2, 72.3, 71, 200 MS File

[56] References Cited

U.S. PATENT DOCUMENTS

| | | | |
|---|---|---|---|
| 3,711,844 | 1/1973 | Irwin | 360/48 |
| 3,740,720 | 6/1973 | Swaney | 360/50 |
| 4,321,632 | 3/1982 | Leis et al. | 360/72.2 |
| 4,375,655 | 3/1983 | Korth et al. | 360/15 |
| 4,377,825 | 3/1983 | Kasubuchi et al. | 360/48 |
| 4,380,047 | 4/1983 | Eisenhard et al. | 360/15 |

OTHER PUBLICATIONS

Navy TDB vol. 4, No. 8, "Cartridge Tape Formatter and Interface", Boland, Aug. 1979.

*Primary Examiner*—Donald McElheny, Jr.
*Assistant Examiner*—Steven R. Garland

*Attorney, Agent, or Firm*—Baker, Maxham, Callan & Jester

[57] ABSTRACT

A tape recording system for connection to a controller of a floppy disk data recording system for recording data in a stream on a recording tape in the same format that data is recorded on a disk by the disk data recording system. A control processor responds to sensing a beginning-of-stream indicator on the tape (a) by causing an initial gap to be erased in the tape stream adjacent the beginning-of-stream indicator and (b) by next providing an initial beginning-of-segment index pulse to the controller. The control processor responds to the combination of (a) a gate signal from the controller provided simultaneously with a formatting signal and (b) the sensing that the length of tape transported past the transducer head following provision of a beginning-of-segment index pulse corresponds to the length of a concentric track on a disk (a) by providing an end-of-segment index pulse to the controller, (b) by next causing an inter-segment gap to be erased in the tape stream and (c) by finally providing another beginning-of-segment index pulse to the controller. The controller responds to the beginning-of-segment index pulse from the control processor by providing to the transducer head a formatting signal for recording a segment that ends when the following end-of-segment index pulse is provided to the controller by the control processor; and the transducer head records the segment in the tape stream between consecutive erased gaps.

2 Claims, 5 Drawing Figures

RECORDING SYSTEM FOR RECORDING DATA ON TAPE IN A DISK-RECORDING FORMAT

BACKGROUND OF THE INVENTION

The present invention generally pertains to data recording systems and is particularly directed to a system for recording data on tape in a disk recording format.

The five and one-quarter inch Winchester recording disk which provides substantial storage capacity and rapid data access is becoming increasingly popular as a principal memory for personal and small business computers, which until recently, used exclusively flexible or floppy disk memories. A five and one-quarter inch Winchester disk may have a memory storage capacity of, for example, fifty-five megabytes. On the other hand, a typical floppy disk may have a storage capacity of only one-quarter megabyte.

Many computer systems have backup memory devices to assure against malfunctions or physical damage that could destroy the principal data bank. In the past, in personal and small business computer systems, the backup storage unit has typically consisted of a second floppy disk drive. However, the increasing use of five and one-quarter inch Winchester disk drives in personal and small business computers has created a need for greater backup storage. Floppy disk drives are unsuitable for use as backup storage for a five and one-quarter inch Winchester disk drive because the hard disk stores many times more information than a single floppy disk. For example, forty one-quartermegabyte floppy disks would be needed to back up one ten megabyte Winchester disk drive, making backup storage a time-consuming inconvenience for the operator.

Magnetic tape is a more practical form of backup storage for the five and one-quarter inch Winchester recording disk.

A typical prior art system for recording data on a floppy recording disk 9 is shown in FIG. 1. This prior art system includes a disk recorder controller 10, a host interface circuit 11, a control logic circuit 12, a write logic circuit 13, a read logic circuit 14, a spindle 15, a transducer head assembly 16, a stepper motor 17, a drive motor 18, a motor drive circuit 19, a "track 00" switch 20, a write protect switch 22, an index pulse LED (light emitting diode) 23 and an index pulse detector 24. The disk 9 is contained in a diskette 21, and is engaged on the spindle 15 for rotation within the diskette 21.

A CPU (central processing unit) 25 is connected to the disk recorder controller 10 by a bus 26. Data, addresses and control signals are communicated between the CPU 25 and the disk recorder controller 10 over the bus 26.

Signals are communicated between the disk recorder controller 10 and the control logic circuit 12 via a bus 27, the host interface circuit 11 and lines 29, 30, 31, 32 and 33.

Step command signals and a direction select signal from the disk recorder 10 are provided on lines 29 and 30 respectively to the control logic circuit 12 for controlling which track of the recording disk 9 is accessed by the transducer head. The recording disk 9 has concentric tracks. The control logic circuit 12 provides stepper A, B, C and D control signals on lines 35, 36, 37 and 38 to the stepper motor 17. The control logic circuit 12 provides a "track 00" signal on line 31 to the disk recorder controller 10 when the transducer head is accessed to the outermost track on the disk. The control logic circuit derives the "track 00" signal from line 40 which is connected to the "track 00" switch 20, together with a common line 41.

A "motor on" signal from the disk recorder controller 10 is provided on line 33 to the control logic circuit 12 for controlling the drive motor 18. The drive motor 18 is coupled to the spindle 15 for rotating the turntable so that the transducer head can access various locations on each concentric track of the recording disk. The control logic circuit 12 provides motor drive signals on line 42 to the motor driver circuit 19, which in turn provides motor control signals on line 43 to the drive motor 18. A speed signal is provided on line 45 to the motor driver circuit 19 from a tachometer attached to the drive motor 18 for completing a servo loop for controlling the speed of the drive motor 18.

The control logic circuit 12 provides a "head load solenoid" signal on line 46 to the transducer head assembly 16 for placing said transducer head in contact with the recording disk 9, thereby allowing recording on the recording disk 9.

The control logic circuit 12 provides an index pulse on line 32 to the disk recorder controller 10 for every rotation of the disk 9. The control logic circuit 12 generates the index pulse on line 32 in response to receiving an index pulse detection signal on line 47 from the index pulse detector 24. The index pulse detector 24 detects light from the index pulse LED 23 that is transmitted through a hole 48 in the disk 9 at a fixed point during each rotation of the disk 9. The index pulse LED 23 is energized by a signal on line 49 from the control logic circuit 12.

The format for recording on the recording disk 9 is keyed to the reception of index pulses by the disk recorder controller 10. The controller 10 responds to the index pulse when in a formatting mode by providing a recording signal to the write logic circuit 13 on line 51 for formatting a recorded track on the disk 9. The recording signal for each track includes a first fill field, followed by a predetermined number of sectors including identifying addresses and data, followed by a second fill field until the index pulse is again received upon completion of one revolution of the disk 9. Recording is enabled only when a "write gate" signal is provided by the disk recorder controller 10 to the write logic circuit on line 52. The write logic circuit 13 provides the signal to be recorded to the transducer head via line 53.

A write protect switch 22 is provided for connection to a recording disk when it is desired to prevent recording on the disk 9. The write protect switch 22 is connected to the write logic circuit 13 by a signal line 54 and a common line 55. The write logic circuit 13 provides a "write protect" signal on line 57 to the disk recorder controller 10 to prevent the controller 10 from providing recording signals on write data line 51.

The signals on lines 51, 52 and 57 are communicated between the disk recorder controller 10 and the write logic circuit via bus 27 and the host interface circuit 11.

The read logic circuit 14 receives signals read by the transducer head on line 59 and conditions and provides the received read data signals on line 61 to the disk recorder controller 10 via the host interface circuit 11 and bus 27.

SUMMARY OF THE INVENTION

The present invention is a recording tape data recording system for connection to a host controller of a floppy disk data recording system for recording data in a stream on a recording tape in the same format that data is recorded on a floppy disk by the floppy disk data recording system. That such system is a more practical form of backup storage for a hard recording disk has been pointed out above. A stream is one of a number of longitudinal areas on a tape defined by the accessed position of a recording head.

One feature of the system of the present invention is that the disk recorder controller of the prior art disk recording system described hereinabove can be connected to the system of the present invention as the host controller thereby economically reducing development and production costs.

The host controller is operable in a formatting mode in which the host controller responds to a first-received index pulse by providing a formatting write data signal to record a segment that has a format including a first fill field, followed by a predetermined number of sectors that individually include an address field and a data field, followed by a second fill field until a second index pulse is received. The host controller also is operable in a write mode in which the host controller responds to recognition of a predetermined address read from an accessed recorded sector by providing a recording write data signal to write data in the data field of the accessed sector. The host controller provides a write gate signal simultaneously with the provision of either write data signal.

The recording system of the present invention includes a read/write transducer head for connection to the host controller for reading data from the tape stream, or writing data in the tape stream, or erasing in the tape stream; transport apparatus for transporting the tape past the transducer head to cause the transducer head to access a stream on the recording tape; a first sensor for sensing a beginning-of-stream indicator on the recording tape; a second sensor coupled to the transport apparatus for sensing the length of tape transported past the transducer head; and a control processor.

The control processor is adapted for connection to the host controller and is coupled to the transducer head and the first and second sensors for responding to the first sensor sensing the beginning-of-stream indicator (a) by providing an erase command to the transducer head for causing an initial gap to be erased in the tape stream adjacent the beginning-of-stream indicator and (b) by next providing an initial beginning-of-segment index pulse to the host controller, and for responding to the combination of (a) the write gate signal from the host controller that is provided simultaneously with the formatting write data signal and (b) the second sensor sensing that the length of tape transported past the transducer head following provision of a beginning-of-segment index pulse corresponds to the length of a concentric track on a floppy recording disk (a) by providing an end-of-segment index pulse to the host controller, (b) by next providing an erase command to the transducer head for causing an inter-segment gap to be erased in the tape stream and (c) by finally providing another beginning-of-segment index pulse to the host controller.

When operated in the formatting mode, the host controller responds to each beginning-of-segment index pulse from the control processor by providing to the transducer head a formatting write data signal for recording a segment that ends when the following end-of-segment index pulse is provided to the host controller by the control processor; and the transducer head responds to the formatting write data signal provided by the host controller by recording the segment in the tape stream between consecutive erased gaps.

Additional features of the present invention are described in relation to the description of the preferred embodiment.

DESCRIPTION OF THE PREFERRED EMBODIMENT

The preferred embodiment of the system of the present invention is designed for use in the preferred embodiment of the cartridge tape drive described in a United States patent application by William M. Barton, Jr., John F. Murphy, Karl B. Offerman and Richard G. Fisher entitled "Cartridge Tape Drive", filed Nov. 15, 1982, Ser. No. 441,762, assigned to the same assignee as the present application, the disclosure of which prior application is incorporated herein by reference.

The tape cartridge drive described therein is designed for receiving a magnetic tape cartridge 20 (FIG. 2) similar to that described in ANSI standard X3.55-1977. One such cartridge is model DC300XL sold by Minnesota Mining and Manufacturing Company, Saint Paul, Minn., U.S.A. The cartridge 20 contains one-quarter inch width magnetic recording tape 44.

Figure 2:
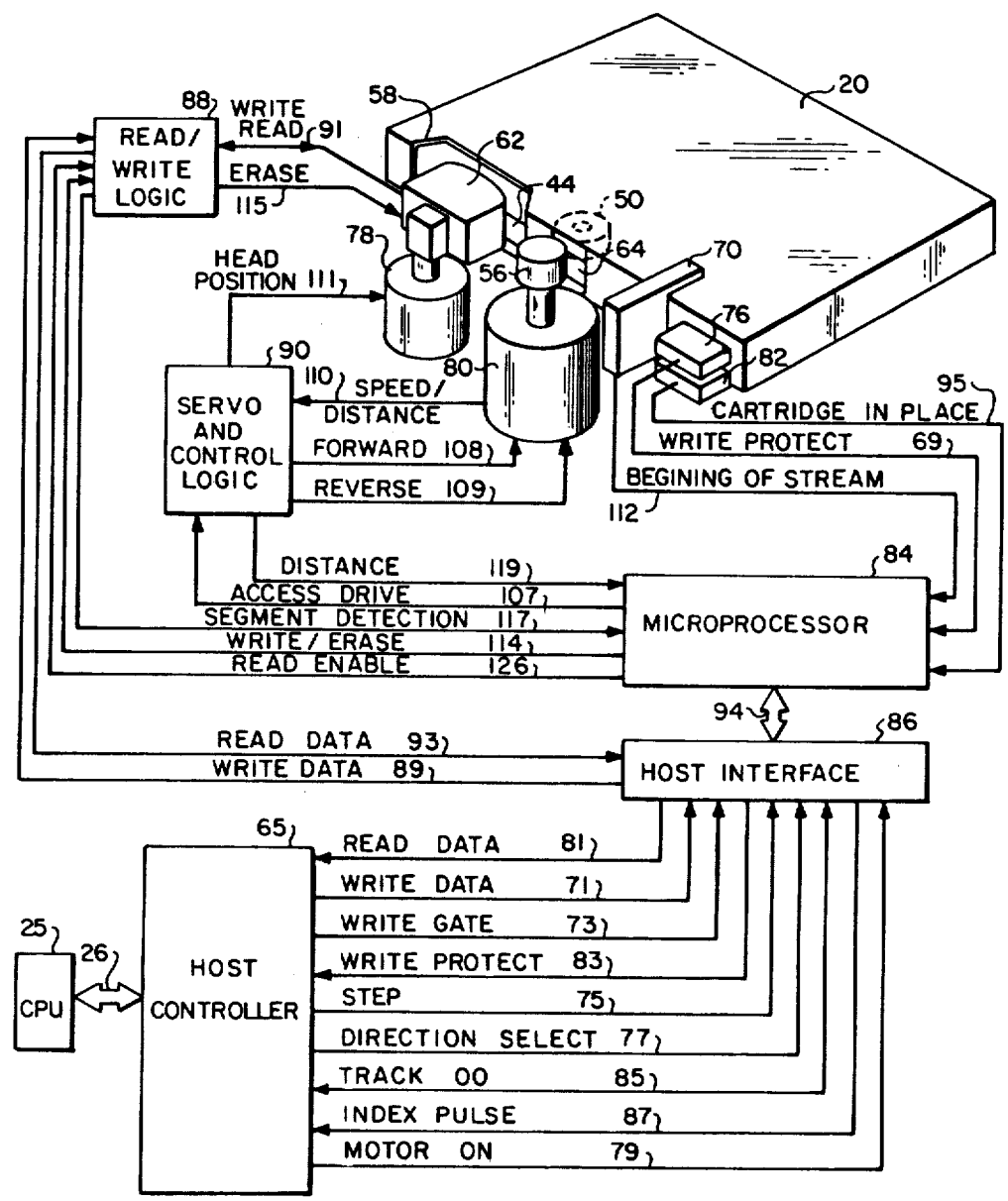
FIG. 2 is a block diagram of a system according to the present invention for recording data in a stream on a tape in a disk recording format.

The preferred embodiment of the recording system of the present invention is shown in FIG. 2 in engagement with a tape cartridge 20. The system includes a capstan drive roller 56, a transducer head 62, a host controller 65, a beginning-of-stream sensing mechanism 70, a write protect sensor 76, a stepper motor 78, a transport drive motor 80, a "cartridge in place" sensor 82, a microprocessor 84, a host interface circuit 86, a read/write logic circuit 88 and a "servo and control logic" circuit 90.

The cartridge 20 has a cut-out region 58 along one side edge thereof which is conformably shaped for receiving the transducer head 62 so that the head 62 can make contact with the tape 44 as illustrated in FIG. 2. The cartridge 20 also has a cut-out region 64, where the capstan drive roller 56 contacts a belt capstan roller 50 within the cartridge 20. The belt capstan roller 50 has an upper larger portion and a lower smaller portion. The larger portion of the drive belt capstan 50 extends above and beyond the magnetic tape 44 so that the capstan drive roller 56 can engage the belt capstan roller without touching the tape 44.

The cartridge 20 also has a mirror positioned behind a window which is utilized in connection with the beginning-of-stream sensing mechanism 70 for sensing the load point and early warning indications on the tape 44. The cartridge 20 also has a write protect mechanism consisting of a rotatable half cylinder positioned in front of a cut-out region. The write protect sensor 76 determines whether or not such cut-out region is blocked by the semi-circular portion of the file protect cylinder and provides a write protect signal on line 69 when the cut-out region is not blocked.

The transducer head 62 is vertically positionable by energizing the stepper motor 78 to select any one of a plurality of different streams on the tape 44. The capstan drive roller 56 is mounted on the upper end of the shaft of the transport drive motor 80. The sensor 82 is mounted adjacent to the write protect sensor 76 and is utilized to detect when a cartridge 20 is in place within the drive.

The host controller 65 is identical to the disk recorder controller 10 in the prior art disk recording system described above in relation to FIG. 1. The host controller 65 communicates with the CPU 25 over the bus 26. The host controller 65 provides a write data signal on line 71, a write gate signal on line 73, step command signals on line 75, a direction select signal on line 77 and a "motor on" signal on line 79 in the same manner as the like-identified signals are provided by the disk recorder controller 10 on lines 51, 52, 29, 30 and 33 respectively in the prior art disk recorder system of FIG. 1. The host controller 65 processes a read data signal received on line 81, a write protect signal received on line 83, a "track 00" signal received on line 85, and index pulses received on line 87 in the same manner as the like-identified signals received by the disk recorder control 10 from lines 61, 57, 31 and 32 respectively are processed in the prior art disk recorder system of FIG. 1.

The write data signal on line 71 from the host controller 65 is provided to the transducer head 62 via the host interface circuit 86, line 89, the read/write logic circuit 88 and line 91. The read data signal on line 81 is provided to the host controller 65 from the transducer head 62 via the line 91, the read/write logic circuit 88, line 93 and the host interface circuit 86.

The write gate signal on line 73, the step command signals on line 75, the direction select signal on line 77 and the "motor on" signal on line 79 from the host controller 65 are provided to the microprocessor 84 via the host interface circuit 86 and a bus 94. The write protect signal on line 83, the "track 00" signal on line 85 and the index pulses on line 87 are provided to the host controller 65 from the microprocessor 84 via the bus 94 and the host interface circuit 86.

The microprocessor 84 is enabled by a "cartridge in place" signal provided on line 95 from the sensor 82 when the cartridge 20 is in place in the cartridge tape drive.

Figure 3:
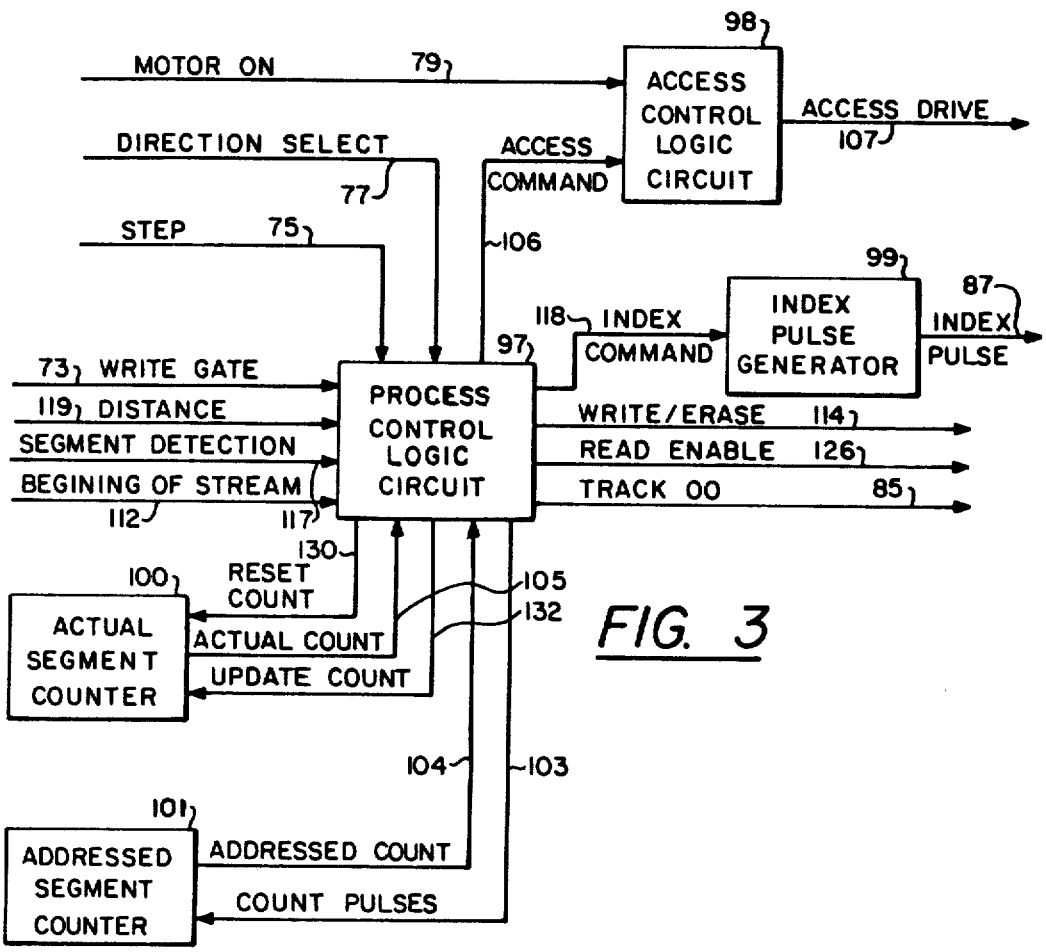
FIG. 3 is a functional block diagram for the microprocessor of the system of FIG. 2.

The microprocessor 84 includes logic circuits and firmware. Referring to FIG. 3, the microprocessor functions as though it effectively includes a process control logic circuit 97, an access control logic 98, an index pulse generator 99, an actual segment counter 100 and an addressed segment counter 101.

Figure 4:
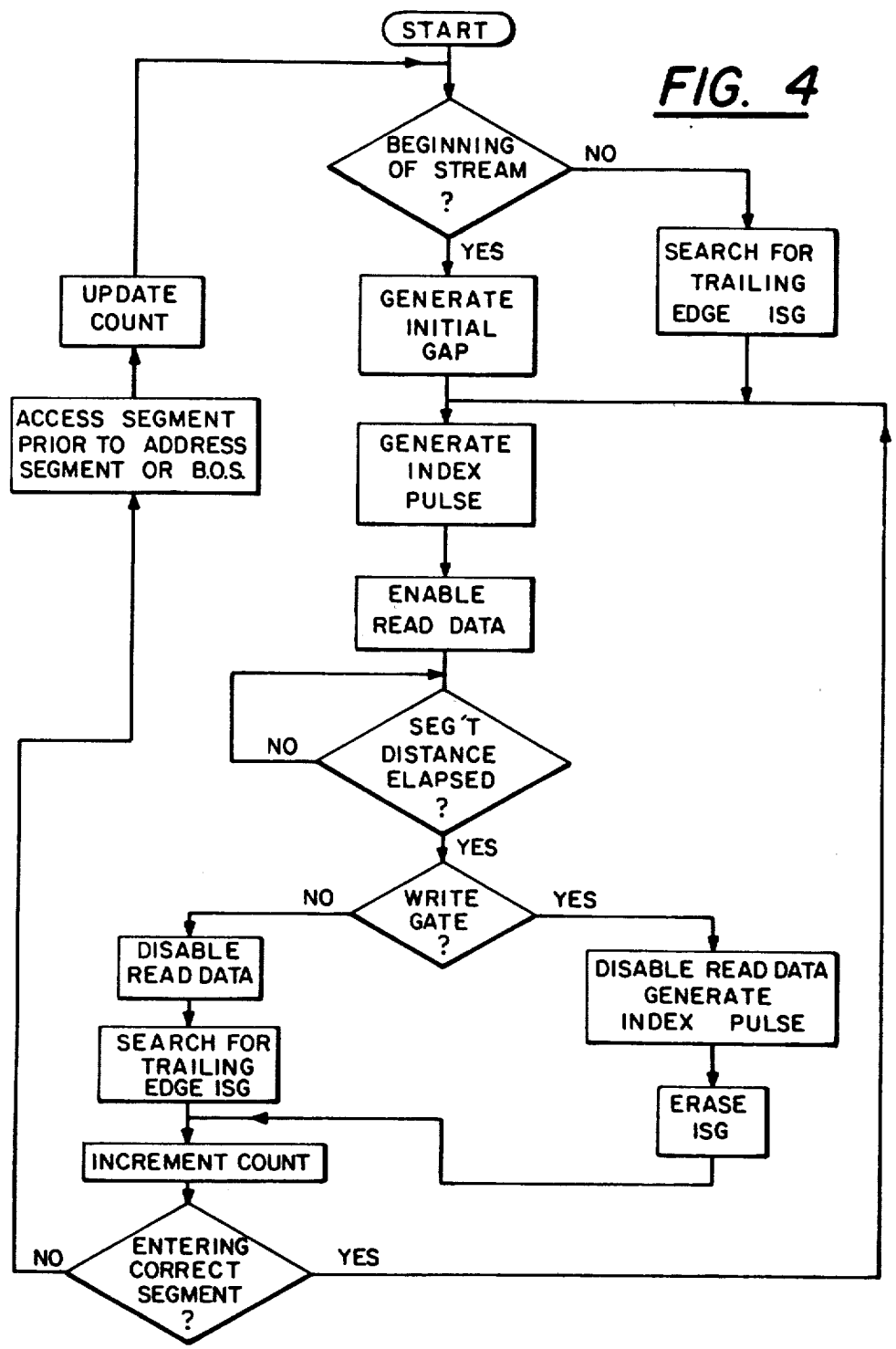
FIG. 4 is a process flow diagram for the process logic circuit shown in FIG. 3.

A process flow diagram for the process control logic circuit 97 is shown in FIG. 4.

Referring to FIG. 3, the process control logic circuit 97 responds to step commands on line 75 and the direction select signal on line 77 by providing count pulses on line 103 to the addressed segment counter 101. The addressed segment counter 101 provides an addressed count signal on line 104 indicating the segment in the stream on the tape 44 that should be accessed by the transducer head 62.

The actual segment counter 100 provides an actual count signal on line 105 indicating the segment being accessed by the transducer head 62.

The process control logic circuit 97 compares the addressed count signal on line 104 with the actual count signal on line 105 and responds to such comparison by providing an access command signal on line 106 to the access control logic circuit 98 for controlling the transport apparatus in the cartridge tape drive to cause the transducer head 62 to access the segment that should be accessed. The operation of the actual segment counter in providing the actual count signal on line 105 is described below in relation to the description of the process flow diagram of FIG. 4.

Referring to both FIGS. 2 and 3, the access control logic circuit 98 responds to the "motor on" signal on line 79 and the access command signal on line 106 by providing an access drive signal on line 107 to the "servo and control logic" circuit 90. The servo and control logic circuit 90 provides forward and reverse signals on lines 108 and 109 respectively to the transport drive motor 80. A tachometer (not shown) coupled to the capstan drive roller 56 provides a speed/distance indication signal on line 110 to the servo and control logic circuit 90 to complete a servo loop for controlling the speed at which the tape 44 is transported past the transducer head 62.

The servo and control logic circuit 90 further responds to the access drive signal on line 107 by providing a head position signal on line 111 to the stepper motor 78 for controlling the stepper motor 78 to cause the transducer head to access the stream on the tape 44 that contains the segment that should be accessed.

Figure 5:
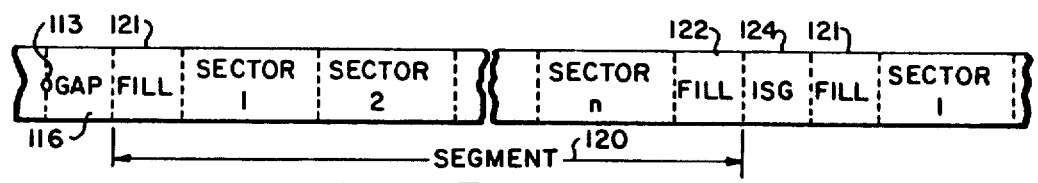
FIG. 5 illustrates the format in which the system of the present invention records in a stream on a recording tape.

When the transport drive motor 80 is driven in the forward direction for recording, the load point indication provided on the tape 44 as manufactured is sensed by the sensing mechanism 70 as the fully rewound tape 44 begins to be transported past the transducer head 62. When the transport drive motor is driven in the reverse direction for recording, the early warning indication provided on the tape 44 as manufactured is sensed by the sensing mechanism 70 as the fully wound tape 44 begins to be transported past the transducer head 62. The sensing mechanism provides a beginning-of-stream indication signal on line 112 in response to sensing the load point indication on the tape 44 when recording in the forward direction and in response to sensing the early warning indication on the tape 44 when recording in the reverse direction. The load point and early warning indications thereby serve as beginning-of-stream indicators, and typically are provided on the tape 44 in the form of a hole 113, as in FIG. 5, which illustrates a formatted stream on the tape 44. FIG. 5 is not drawn to scale.

The process control logic circuit 97 responds to the beginning-of-stream signal on line 112 by providing an erase command signal on line 114 to the read/write logic circuit 88 to cause an erase signal to be provided on line 115 to the transducer head 62 for erasing an initial gap 116 of a predetermined length in the stream on the tape 44. At the conclusion of the initial gap, the process control logic circuit 97 provides an index command on line 118 to the index pulse generator 99. The index pulse generator 99 responds to the index command on line 118 by providing an initial beginning-of-segment index pulse on line 87 to the host controller 65.

Figure 1:
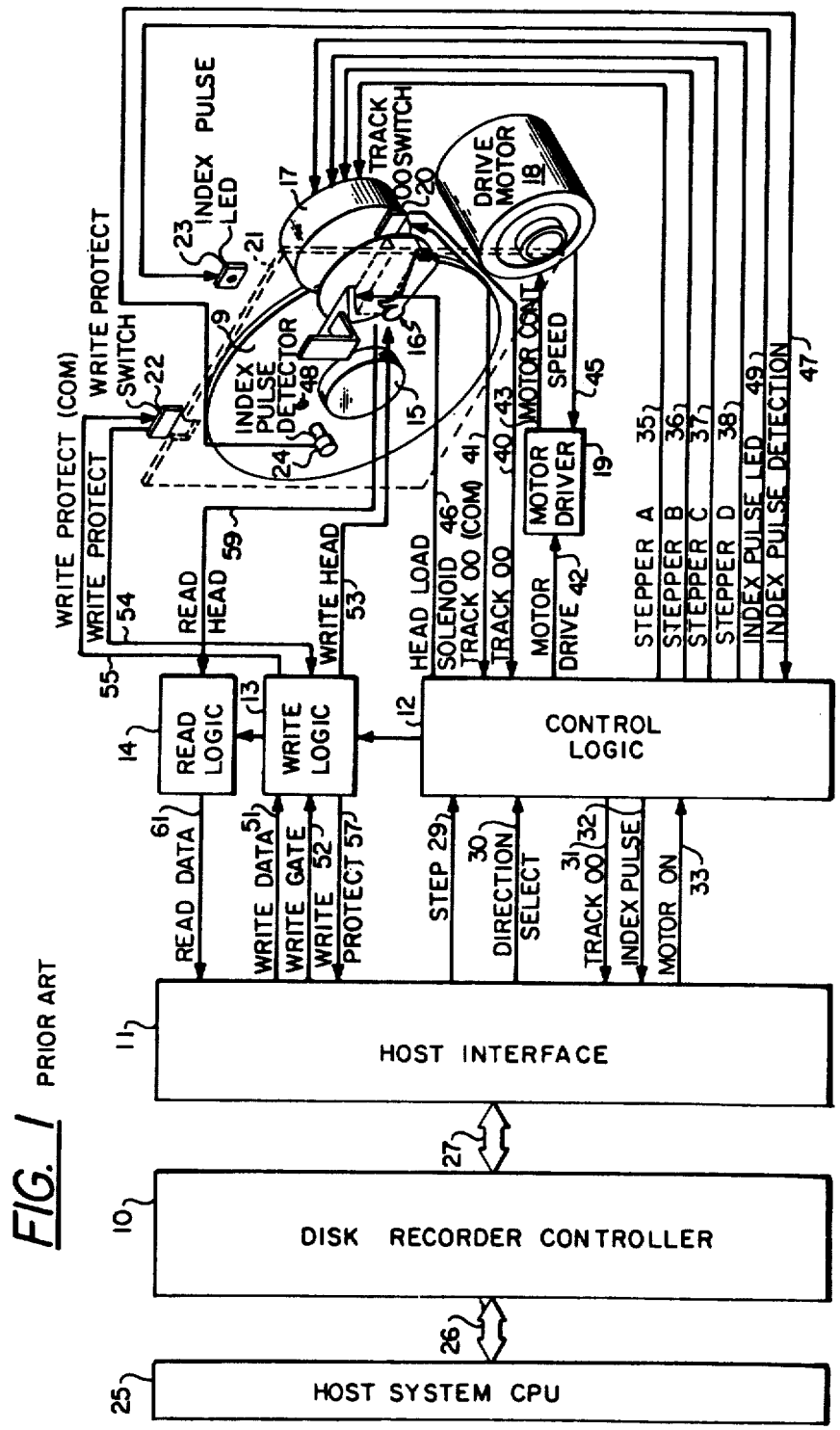
FIG. 1 is a block diagram of a prior art system for recording data on a recording disk.

The host controller 65 responds to a beginning-of-segment index pulse on line 87 when in a formatting mode by providing a recording segment signal to the transducer head 62 via line 71 for formatting a recorded stream on the tape 44. Referring to FIG. 5, each recorded segment 120 includes a first fill field 121, followed by a predetermined number of sectors 1, 2, ... n including identifying addresses and data, followed by a second fill field 122 until an end-of-segment index pulse is provided on line 87 by the microprocessor 84 to the host controller 65. The segment length is equivalent to the length of a concentric track on the recording disk 9 (FIG. 1).

The host controller 65 also provides the write gate signal on line 73 whenever a recording segment signal is provided on line 71 to the transducer head 62 for formatting a recorded stream on the tape 44. The write gate signal on line 73 causes the process control logic circuit to provide a write command signal on write/erase line 114 to the read/write logic circuit 88 to enable the recording segment signal on line 71 to be provided to the transducer head 62 via line 91.

The speed/distance indication signal on line 110 is passed by the "servo and control logic" circuit 90 via line 119 as a distance signal to the process and control logic circuit 97. The process and control logic circuit 97 processes the distance signal on line 119 to determine the length of tape 44 from the beginning of each segment 120. The process control logic circuit 97 responds to such determination by providing index commands on line 118 to the index pulse generator 99 to cause the index pulse generator 99 to generate end-of-segment index pulses on line 87 as a function of the length of tape transported past the transducer head 62 following each beginning-of-segment index pulse. The end-of-segment index pulses on line 87 are provided at predetermined fixed-length intervals along the stream on the tape 44 to define segments of uniform length.

The process control logic circuit 97 provides an erase command on line 114 to the read/write logic circuit 88 for erasing an inter-segment gap 124 of a predetermined length in the stream following provision of each end-of-segment index pulse when a write gate signal is simultaneously received on line 73, thereby indicating that the host controller 65 is in a formatting mode.

At the conclusion of each of the erase commands defining inter-segment gaps 124, the process control logic circuit 97 provides an index command to the index pulse generator 99, which in turn provides a beginning-of-segment index pulse following each inter-segment gap 124 in the formatted stream. The host controller 65 responds to each beginning-of-segment index pulse on line 87 when in a formatting mode by providing a segment recording signal on line 71 as described above.

The microprocessor 84 provides the write protect signal from line 69 to the host controller 65 via line 83.

The operation of the process control logic circuit 97 is further described with reference to the process flow diagram of FIG. 4.

At the start, the process control logic circuit 97 looks for a beginning-of-stream signal on line 112. If a beginning-of-stream signal is received on line 112, a command signal is provided on line 114 to cause the initial gap 116 to be erased in the stream by the transducer head 62. If a beginning-of-stream signal is not received on line 112 the process control logic circuit merely searches for a segment detection signal on line 117 which is provided upon the trailing edge of an inter-segment gap 124 being recognized by the read/write logic circuit 88 from the signal read by the transducer head 62.

Upon either the conclusion of the erase command signal on line 114 for generating the initial gap 113, or the receipt of a segment detection signal on line 117, the process control logic circuit 97 provides an index command signal on line 118 for causing a beginning-of-segment index pulse to be generated and provided on line 87 by the index pulse generator 99.

Upon providing the index command signal on line 118, the process control logic control circuit 97 also provides a read enable signal on line 126 to the read/write logic circuit 88 for enabling data read by the transducer head to be provided over line 93 and thence over line 81 to the host controller 65.

The process control logic circuit 97 then determines by processing the distance signal received on line 119 whether a predetermined length of tape 44 defining a recorded segment 120 has been transported past the recording head 62, and upon each such segment-length of tape having been so transported, further determines whether a write gate signal is being received on line 73.

In either case, the read enable signal on line 126 is discontinued so as to disable the provision of the read data signal on line 93 to the host controller via the host interface circuit 86 and line 81.

If the write gate signal is being received on line 73, an index command is provided on line 118 to cause the index pulse generator 99 to generate and provide an end-of-segment index pulse on line 87; and an erase command is provided on line 114 to cause an inter-segment gap 124 to be erased in the stream.

If the write gate signal is not being received on line 73, passage of a segment-length of tape past the transducer head 62 is determined. The process control logic circuit 97 searches for a segment detection signal on line 117 which indicates that the trailing edge of an inter-segment gap 124 has been recognized.

At this point in the process, either the conclusion of the erase command signal on line 114 or the receipt of a segment detection signal on line 117 results in the process logic control circuit 97 providing an update count signal on line 132 to increment the count in the actual segment counter 100 by one. The actual segment counter 100 is reset at the beginning of each stream by a reset signal provided on line 130 by the process control logic circuit 97 in response to receipt of the beginning-of-segment signal on line 112.

The process control logic circuit 97 provides a "track 00" signal on line 85 when the actual count signal provided on line 105 indicates that the first segment in the stream is being accessed by the transducer head 62.

After the count is updated, the process control logic circuit determines whether the transducer head 62 is entering the correct segment of the formatted stream as the tape is being transported in the direction in which data is recorded in the accessed stream. If so, an index command is provided on line 118 to cause the index pulse generator 99 to generate and provide another beginning-of-segment index pulse on line 87 and the process continues with the read enable signal being provided on line 126, etc.

If it is determined that the transducer head 62 is not entering the correct segment, the process control logic circuit 97 provides an access command on line 106 to control the transport drive motor 80 to cause the transducer head to access either the beginning of the stream or the middle of the segment prior to the segment that should be accessed. A count update signal is then provided on line 132 to the actual segment counter 100 and the process is repeated from the start as indicated by the process flow diagram of FIG. 4.

When the host controller 65 is in a read/write mode, it responds to an address requirement from the CPU 27 by searching the formatted stream accessed by the transducer head 62 for the recorded address indicated by the address signal; and the process control logic circuit 97 responds to the comparison of the count signals on lines 104 and 105 by providing an access command signal on line 106 that causes the transducer head 62 to access the segment containing the sector indicated by the address signal.

I claim:

1. A recording tape data recording system for connection to a host controller of a floppy disk data recording system for recording data in a stream on a recording tape in the same format that data is recorded on a floppy disk by the floppy disk data recording system, wherein the host controller is operable in a formatting mode in which the host controller responds to a first-received index pulse by providing a formatting write data signal to record a segment that has a format including a first fill field, followed by a predetermined number of sectors that individually include an address field and a data field, followed by a second fill field until a second index pulse is received, wherein the host controller is operable in a write mode in which the host controller responds to recognition of a predetermined address read from an accessed recorded sector by providing a recording write data signal to write data in the data field of the accessed sector, and wherein the host controller provides a write gate signal simultaneously with the provision of either write data signal; said recording tape data recording system comprising a read/write transducer head for connection to the host controller for reading data from the tape stream, or writing data in the tape stream, or erasing in the tape stream;

transport means for transporting the tape past the transducer head to cause the transducer head to access a stream on the recording tape;

first sensing means for sensing a beginning-of-stream indicator on the recording tape;

second sensing means coupled to the transport means for sensing the length of tape transported past the transducer head; and a control processor for connection to the host controller and coupled to the transducer head and the first and second sensing means for responding to the first sensing means sensing the beginning-of-stream indicator (a) by providing an erase command to the transducer head for causing an initial gap to be erased in the tape stream adjacent the beginning-of-stream indicator and (b) by next providing an initial beginning-of-segment index pulse to the host controller, and for responding to the combination of (a) the write gate signal from the host controller that is provided simultaneously with the formatting write data signal and (b) the second sensing means sensing that the length of tape transported past the transducer head following provision of a beginning-of-segment index pulse corresponding to the length of a concentric track on a said floppy recording disk (a) by providing an end-of-segment index pulse to the host controller, (b) by next providing an erase command to the transducer head for causing an inter-segment gap to be erased in the tape stream and (c) by finally providing another beginning-of-segment index pulse to the host controller;

whereby, when operated in the formatting mode, the host controller responds to each beginning-of-segment index pulse from the control processor by providing to the transducer head a formatting write data signal for recording a segment that ends when the following end-of-segment index pulse is provided to the host controller by the control processor; and wherein the transducer head responds to the formatting write data signal provided by the host controller by recording the segment in the tape stream between consecutive erased gaps.

2. A system according to claim 1, wherein the host controller further provides step command signals for indicating that a different segment should be accessed other than the presently accessed segment; and wherein the control processor further includes a first counter for responding to said step command signals by providing a first count indicating the segment that should be accessed;

a second counter for responding to detection of erased gaps in the tape stream by providing a second count indicating the segment being accessed; and means for comparing said first and second counts and for providing an access command signal to the transport means in response to said comparison to cause the transducer head to access the segment that should be accessed.

* * * * *